US012756556B2

(12) United States Patent
Walther

(10) Patent No.: US 12,756,556 B2
(45) Date of Patent: Oct. 6, 2026

(54) METHOD FOR INTERACTION BETWEEN IOT NODES IN A LOCAL NETWORK AND LOCAL IOT NODE NETWORK

(71) Applicant: Perinet GmbH, Berlin (DE)

(72) Inventor: Karsten Walther, Königs (DE)

(73) Assignee: PERINET GMBH, Berlin (DE)

(*) Notice: Subject to any disclaimer, the term of this patent is extended or adjusted under 35 U.S.C. 154(b) by 0 days.

(21) Appl. No.: 19/041,636

(22) Filed: Jan. 30, 2025

(65) Prior Publication Data

US 2025/0247228 A1 Jul. 31, 2025

(30) Foreign Application Priority Data

Jan. 31, 2024 (DE) ........................ 102024102789.4

(51) Int. Cl.
*H04L 29/06* (2006.01)
*H04L 9/14* (2006.01)
*H04L 67/12* (2022.01)

(52) U.S. Cl.
CPC ................ *H04L 9/14* (2013.01); *H04L 67/12* (2013.01)

(58) Field of Classification Search
CPC ....... H04L 9/14; H04L 67/12; H04L 63/0442; H04L 63/126; H04L 63/166; H04L 63/104; H04L 63/0869; H04L 9/30; H04L 9/3268; H04L 63/0823; H04W 4/06; H04W 4/70; H04W 12/009; H04W 12/55; H04W 12/06
See application file for complete search history.

(56) References Cited

U.S. PATENT DOCUMENTS

| | | | | |
|---|---|---|---|---|
| 11,558,205 | B2 * | 1/2023 | Jin | H04L 9/3268 |
| 11,889,391 | B2 * | 1/2024 | Shan | H04W 12/08 |
| 2017/0201385 | A1 * | 7/2017 | Kravitz | H04L 9/006 |
| 2017/0279620 | A1 * | 9/2017 | Kravitz | H04L 63/0876 |
| 2018/0006829 | A1 * | 1/2018 | Kravitz | H04W 12/06 |
| 2018/0083785 | A1 | 3/2018 | Shields et al. | |
| 2018/0330348 | A1 * | 11/2018 | Uhr | G06Q 20/4014 |
| 2018/0330349 | A1 * | 11/2018 | Uhr | G06Q 20/102 |

(Continued)

FOREIGN PATENT DOCUMENTS

| | | | |
|---|---|---|---|
| DE | 102021111841 | B3 | 9/2022 |
| WO | 2021064096 | A1 | 4/2021 |

(Continued)

*Primary Examiner* — Mahfuzur Rahman
(74) *Attorney, Agent, or Firm* — Seed Intellectual Property Law Group LLP

(57) ABSTRACT

A method for interaction between IoT nodes in a local network is provided. The local network comprises a plurality of IoT nodes. Each IoT node comprises at least one sensor or actuator and a first interface for communication with other nodes. The method comprises: creating a group of IoT nodes from the IoT nodes which together run an application, where at least one of the IoT nodes has a processing unit suitable for executing at least part of an application logic of the application; and determining a group-head IoT node from the IoT nodes, where the group-head node is configured to provide necessary information for secure multicast communication of the IoT nodes with one another. The multicast communication takes place via UDP/IP. The method includes executing the application logic for implementing at least part of the application by way of the processing units of the IoT nodes.

18 Claims, 1 Drawing Sheet

(56) References Cited

U.S. PATENT DOCUMENTS

| | | | | |
|---|---|---|---|---|
| 2019/0174449 | A1* | 6/2019 | Shan | H04W 60/00 |
| 2019/0260464 | A1* | 8/2019 | Roy | H04B 7/18519 |
| 2021/0120462 | A1* | 4/2021 | Chen | H04W 8/02 |
| 2021/0160070 | A1* | 5/2021 | Herrero | H04L 63/166 |
| 2022/0053449 | A1* | 2/2022 | Shan | H04W 36/0066 |
| 2022/0095260 | A1* | 3/2022 | Shan | H04W 60/04 |
| 2022/0104164 | A1* | 3/2022 | Kedalagudde | H04W 8/12 |
| 2022/0132315 | A1* | 4/2022 | Kolekar | H04L 63/205 |
| 2022/0141004 | A1* | 5/2022 | Murray | H04L 9/0861<br>713/171 |
| 2022/0201638 | A1* | 6/2022 | Arrobo Vidal | H04W 48/08 |
| 2022/0311624 | A1* | 9/2022 | Herrero | H04L 63/0428 |
| 2024/0179145 | A1* | 5/2024 | Bao | H04L 63/083 |
| 2024/0187176 | A1* | 6/2024 | Wang | H04B 7/0404 |
| 2024/0414067 | A1* | 12/2024 | Yao | H04L 41/16 |
| 2025/0047451 | A1* | 2/2025 | Xiong | H04L 5/0051 |
| 2025/0048088 | A1* | 2/2025 | Kolekar | H04W 12/02 |
| 2025/0247228 | A1* | 7/2025 | Walther | H04L 9/14 |
| 2025/0373888 | A1* | 12/2025 | Wang | H04N 21/43615 |
| 2025/0379767 | A1* | 12/2025 | Wong | H04L 25/0228 |
| 2026/0095358 | A1* | 4/2026 | Wang | H04L 5/0051 |

FOREIGN PATENT DOCUMENTS

| | | | |
|---|---|---|---|
| WO | 2023075828 | A1 | 5/2023 |
| WO | 2023154333 | A1 | 8/2023 |

* cited by examiner

METHOD FOR INTERACTION BETWEEN IOT NODES IN A LOCAL NETWORK AND LOCAL IOT NODE NETWORK

BACKGROUND

Technical Field

The disclosure relates to a method for interaction between IoT nodes in a local network and to a local IoT node network.

Description of the Related Art

To improve automation, the number of sensors and actuators used which are network-enabled is increasing all the time. Such networks are referred to as the Internet of Things IoT or as the Industrial Internet of Things IIoT. Communication between the sensors and actuators is typically based on an IP protocol. These sensors and actuators can be used in a local network (Smart Home or in a factory). Alternatively, these IoT sensors and actuators can also be directly connected to the Internet.

In particular when using IoT sensors or actuators in a local network, the security of the internal communication must be ensured.

In the priority application of this application, the German Patent and Trademark Office has found the following documents: US 2018/0083785 A1 and WO2023/154333 A1.

BRIEF SUMMARY

Provided is an improved method for interaction between IoT nodes in a local network with improved security.

A method for interaction between IoT nodes or IoT devices in a local network and by a local Internet-of-Things IoT network.

Thus, a method for interaction between IoT nodes in a local network is provided. The local network (e.g., a Local Area Network LAN) is an Ethernet network or a single pair Ethernet network. Each IoT node comprises at least one sensor and/or one actuator and a first interface for communication with other IoT nodes in the local network. A group of IoT nodes is created from the plurality of IoT nodes which together run an application. At least one of the IoT nodes of the group has a processing unit which is suitable for implementing at least part of an application logic of the application (e.g., macro blocks). A group-head IoT node is determined from the IoT nodes of the group during a self-organization phase. The group-head IoT node is configured to provide the members of the group with the necessary information for secure multicast communication. The multicast communication then takes place via a User Datagram Protocol Internet Protocol UDP/IP. The application logic for implementing at least part of the application is executed via the processing units of the IoT nodes. This allows the application logic to be implemented in a distributed manner by the IoT nodes of the group.

The IoT nodes of the group belong to a public key infrastructure PKI that can issue, distribute, and verify digital certificates. The digital certificates are used to secure the communication of the IoT nodes of the group.

In a self-organization phase, a group-head IoT node is determined via self-organization mechanisms using decentralized service discovery procedures and secure 1-to-1 communication, based on a TCP and mTLS protocol.

According to one aspect, macro blocks of the IoT nodes are coupled via messages that are exchanged via the secure multicast communication between the IoT nodes of the group.

According to one aspect, the IoT nodes each have a processing unit, which is suitable for executing part of the application logic of the application. The processing unit can be part of the interface and/or part of the sensor/actuator.

The group head can optionally be determined dynamically by the group at runtime (self-organization). In a self-organization phase (i.e., the formation of the group), secure point-to-point communication (e.g., based on the TCP protocol) is used, in which the associated IoT nodes of a group can be found via service discovery mechanisms.

The application-related communication after the self-organization phase then takes place via secure multicast communication via User Datagram Protocol Internet Protocol UDP/IP.

For example, the head of the group can be determined based on the assigned IP addresses of the IoT nodes. If the selected node is already part of another group and is not the head, then this IoT node can pass the information to the other multicast group.

The group head can output the following information to the other members of the group: a synchronous key, a multicast address, and time information. The other nodes in the group can also adjust to a timebase using the time information. The time information can also be used to determine whether a received message or packet is a current message or a current packet.

The formation of the group can be performed in two steps during the self-organizing phase. In a first step, certificates can be associated to the IoT nodes in the network and keys can be exchanged. In a second step, the IoT nodes can be grouped into a group to perform an application. This can be a self-configurating network (self-X).

In the first step (the formation of the group), the communication is performed via TCP (Transmission Control Protocol) and mTLS (mutual Transport Layer Security). A communication within the group after the self-organizing phase can be a multicast communication via user datagram protocol Internet protocol UDP/IP.

An IoT node can have a memory with a capacity of $<1$ Mbyte, in particular between 150 and 500 kByte. The IoT node therefore only comprises a limited memory capacity.

Instead of a central computer for controlling the application, the application is implemented in a distributed manner by the IoT nodes. The basic idea of this is that IoT nodes inherently possess the necessary computing power for the implementation of typical applications (communication-enabled) and thus a central processing instance, e.g., a PLC, becomes unnecessary.

The application is therefore not implemented centrally but in a decentralized manner, in which the application logic is divided over distributed processing units, e.g., function blocks, or macros, which makes the conventional central controller redundant. For example, in response to external circumstances or by actuating an actuating element, an IoT node (such as a button) sends a message via the multicast channel. This IoT node can perform macro operations and can generate a message based on the environmental influences or the operation of the element, which is sent in the multicast to the members of the group. The receiving IoT nodes typically also have macro operations. The received message can then be used to control the IoT node accordingly.

The respective IoT nodes can be configured by a user so that a message initializes a macro function.

An application logic for executing an application can optionally be implemented in a distributed manner on the IoT nodes themselves using so-called macro blocks. Sensors can, for example, send specific messages to be defined by the user if events occur. Actuators can perform specified actions in response to such messages. In particular, multicast communication makes it possible for a so-called n-to-m interaction to take place, i.e., one sensor controls multiple actuators and one actuator can be controlled by multiple sensors. Optionally, an IoT node can be configured as a multi-sensor actuator.

Optionally, all IoT nodes in the group can share a common timebase. The group-head IoT node determines the shared time base used during the self-organization phase. IoT nodes can insert the current time into the messages sent, causing the bit sequence transmitted over the line to change automatically with time. This prevents an attacker from simply resending the message, e.g., to open a door, at a later time, or alternatively this would be detected by the receiving nodes as an attack. The use of a timebase is particularly advantageous because it means that each node can update the time independently.

An IoT node can be configured to sign a message to be sent. The receiving IoT nodes are configured to check the origin of the message based on the signature it contains.

The first interface of the IoT nodes can be configured to be display-less and free of control elements.

According to one example, at least one of the IoT nodes is a dynamic IoT node that is at least temporarily part of the network (120). The dynamic IoT node is excluded from the selection of the group-head IoT node.

Each IoT node or IoT device can authenticate itself against the other IoT nodes of a communication group using an asymmetric encryption method. The provision of the necessary key pairs and certificates is described, e.g., in WO 2021/064096. A cryptographic method such as this allows the secure autonomous connection of IoT nodes.

The sensors can be configured, for example, as controls, buttons, rotary controls, threshold switches, e.g., level, motion, environment sensors, temperature sensor, humidity sensor, CO2 sensor, light sensor, wind sensor, vibration sensor, and/or electric current sensors.

The actuators can be configured, for example, as lights, blinds, valves, mixers, pumps, actuators, door openers/closers and/or heating/cooling elements.

Communication can be network-based via UDP/IP or TCP/IP.

The IoT nodes can be used in local networks without routing between them.

The IoT nodes only have the controls necessary for their function (no displays and keys for configuration).

The IoT nodes are deeply embedded systems (systems with low computing power and memory compared to conventional computers (laptops, mobile phones)).

The IoT nodes are optionally battery-free.

The interaction of the IoT nodes can be decentralized.

Further designs of the disclosure are the subject matter of the dependent claims.

BRIEF DESCRIPTION OF THE SEVERAL VIEWS OF THE DRAWINGS

Advantages and exemplary embodiments of the disclosure are elucidated below with reference to the drawing.

DETAILED DESCRIPTION

Figure 1:
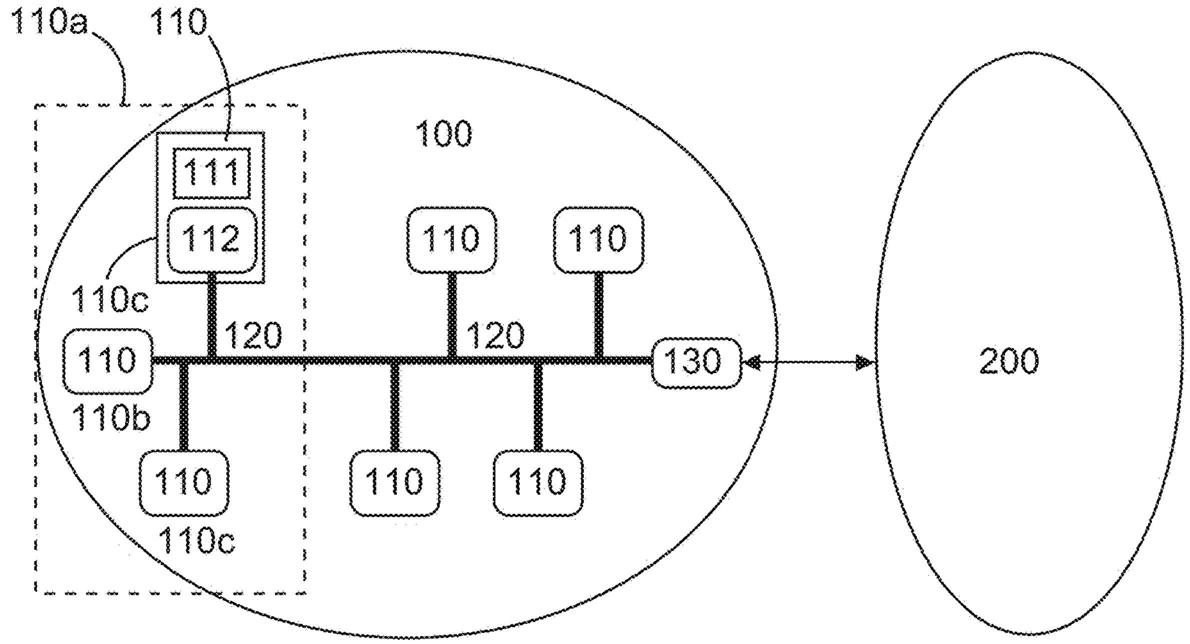
FIG. 1 shows a schematic drawing of a local network.
Figure 2:
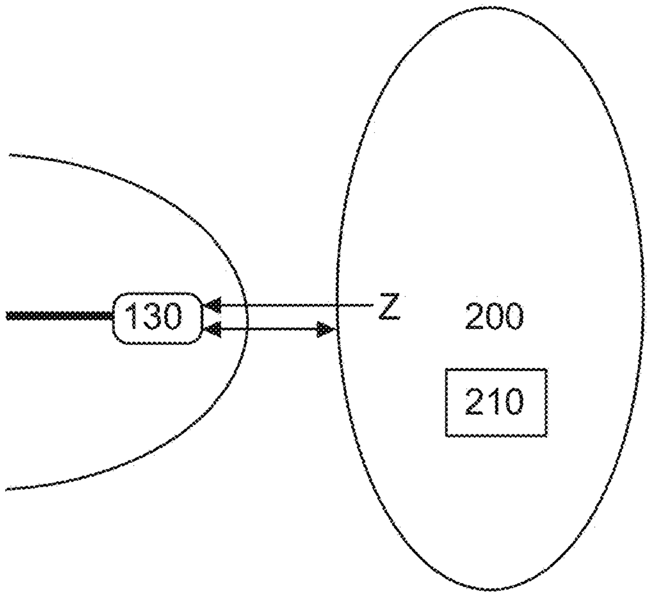
FIG. 2 shows an enlarged view of part of the local network of FIG. 1.

FIG. 1 shows a schematic drawing of a local network according to a first exemplary embodiment and FIG. 2 shows an enlarged view of part of the local network of FIG. 1. A local network 100 has a plurality of IoT (Internet of Things) nodes 110, which are connected to each other by an Ethernet network or a single pair Ethernet network 120. The IoT nodes 110 can only communicate with other IoT nodes 110 within the local network 100. Each node 110 can have a sensor and/or an actuator 111 and an interface 112 for communication with other IoT nodes 110 in the network 100.

To implement an application, a group **110*a* is formed from the required IoT nodes 110. Group information (timebase, multicast address, and/or encryption information) can be exchanged based on a TCP/IP connection secured via mTLS. The communication between the IoT nodes 110 of the group 100*a* in the network 100 is then carried out based on a User Datagram Protocol Internet Protocol UDP/IP, which is secured via symmetric encryption. One of the IoT nodes of group 100*a* is designated as the group head 110*b***, and provides the necessary information for the secure multicast communication for the other nodes (e.g., the multicast address to be used, the symmetric connection key to be used and optionally, the shared timebase to be used). The application logic can be based on processing of macro blocks. This means that distributed control of the application can be achieved by the IoT nodes themselves.

Typical sensors are, for example, controls, buttons, rotary controls, threshold switches, e.g., level, motion, ambient sensors for temperature, humidity, CO2, light, wind, vibration, and current sensors.

Typical actuators are, e.g., lights, blinds, valves, mixers, pumps, actuators, door openers/closers, and heating/cooling elements.

As protection against replay attacks, the UDP/IP communication can use a common timebase. Because the data is transmitted in encrypted form, an attacker cannot send a valid message once again at a later time, thereby causing unwanted actions.

Thus, automated machine-to-machine communication can also be enabled in local networks with a very high number of IoT nodes 110.

According to the first exemplary embodiment, an automatic facility for authenticating the IoT nodes 110 within the local network 100 will be enabled, without the need for a continuous active Internet connection, for example to a root certificate server 210. This is achieved by relocating all security mechanisms into the local network without the need for an active Internet connection during authentication.

The IoT nodes or IoT devices are display-less and control-element-free devices. This can reduce the costs of the IoT nodes or IoT devices. The IoT nodes or IoT devices can only be activated via the local network. For example, parameters can be set using a browser on the computer 130.

The IoT node has neither a display nor control elements nor a reset button. The IoT node only has a first interface for communicating with the network 120. A second interface can be used to communicate with devices that are connected to the IoT node 110.

According to one aspect, the IoT nodes can be network-enabled Smart Home devices, devices of a building automation system or industrial devices.

A public key infrastructure PKI can be used during the initialization of the multicast group. Using a service discovery as described in, e.g., WO 2021/064096, the IoT nodes which are intended to be part of the group can be determined. During the initialization of the multicast group, one of the IoT nodes is selected as the group head. The purpose of the group head is to output the information required for secure multicast communication (symmetric key, multicast address and time info) to all nodes in the group.

According to one example, a method for interaction between Internet-of-Things IoT nodes (110) in a local network (100) is provided, wherein the local network (100) is formed by an Ethernet network or a single pair Ethernet network and comprises a plurality of IoT nodes (110), and wherein each IoT node (110) comprises at least one sensor and/or an actuator (111) and a first interface (112) for communication with other IoT nodes (110) in the local network (120). The method comprises the steps of:

creating a group (110*a*) of IoT nodes (110) from the plurality of IoT nodes (110) which together run an application, wherein all nodes belong to a common public key infrastructure PKI, determining a group-head IoT node (110*b*) from the IoT nodes (110) of the group (110*a*) via self-organization mechanisms using distributed service discovery procedures and secure 1-to-1 communication, wherein the group-head IoT node (110*b*) is configured to ensure the necessary information for secure multicast communication of the IoT nodes (110) in the group (110*a*) with one another via a User Datagram Protocol Internet Protocol UDP/IP, executing the application logic via macro blocks that can be executed on the IoT nodes, which are coupled via messages exchanged via the secure multicast communication.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for interaction between Internet-of-Things (IoT) nodes in a local network, wherein the local network is formed by an Ethernet network or a single pair Ethernet network and includes a plurality of IoT nodes, and wherein each IoT node includes at least one sensor or actuator and a first interface for communication with other IoT nodes of the plurality of IoT nodes in the local network, and wherein the method comprises:

forming a group of IoT nodes from the plurality of IoT nodes which together run an application, wherein at least one of the IoT nodes of the group has a processing unit configured to execute at least part of an application logic of the application;

determining a group-head IoT node from the IoT nodes of the group, wherein the group-head IoT node is configured to provide necessary information for secure multicast communication of the IoT nodes in the group with each other, wherein the secure multicast communication in the group takes place via a User Datagram Protocol Internet Protocol (UDP/IP); and executing the application logic for implementing at least part of the application using the processing unit of the at least one of the IoT nodes, wherein at least all the IoT nodes of the group belong to a common public key infrastructure, which issues, distributes and verifies digital certificates that are used to secure the communication between the IoT nodes of the group, wherein in a self-organization phase, the group-head IoT node is determined via self-organization mechanisms using distributed service discovery procedures and secure one-to-one communication, based on a Transport Control Protocol (TCP) and a mutual Transport Layer Security Protocol (mtLS), wherein the IoT nodes are configured to sign a message to be sent, and wherein receiving IoT nodes are configured to check an origin of the message based on a signature included therein.

2. The method according to claim 1, wherein execution of the application logic by means of which the processing unit of the at least one of the IoT nodes are coupled via messages exchanged via the secure multicast communication between the IoT nodes of the group.

3. The method according to claim 1, wherein all IoT nodes of the group share a common timebase, and the IoT nodes embed the common timebase in messages sent, and receiving IoT nodes check whether the messages are current based on the common timebase contained therein.

4. The method according to claim 3, wherein the IoT nodes update the common timebase independently.

5. The method according to claim 1, wherein the receiving IoT nodes are configured to implement different rights within the application based on the signature.

6. The method according to claim 1, wherein the first interface of the IoT nodes is configured to be display-less and free of control elements.

7. The method according to claim 1, wherein each IoT node has a first public cryptographic key and a first private cryptographic key, the first private cryptographic key being stored in advance or generated by the IoT node.

8. The method according to claim 1, wherein the necessary information for secure multicast communication between the IoT nodes includes a multicast address, a symmetric key and a common timebase.

9. The method according to claim 1, wherein the secure multicast communication between the IoT nodes within the group represents an n-m communication.

10. A local IoT node network, wherein the local IoT node network is an Ethernet network or a single pair Ethernet network, comprising:

a plurality of IoT nodes, wherein each IoT node has at least one sensor or actuator and a first interface for communication with other IoT nodes in the local IoT node network, wherein a group of IoT nodes from the plurality of IoT nodes is configured to run an application together, wherein a group-head IoT node from the group of IoT nodes is configured to ensure necessary information for secure multicast communication of the IoT nodes in the group with each other via a User Datagram Protocol Internet Protocol (UDP/IP), wherein at least one of the IoT nodes of the group has a processing unit which is configured to execute at least part of an application logic of the application, wherein at least all IoT nodes of the group belong to a common public key infrastructure, which issues, distributes and verifies digital certificates that are used to secure the communication between the IoT nodes of the group, wherein in a self-organization phase, the group-head IoT node is determined via self-organization mechanisms using distributed service discovery procedures and secure one-to-one communication, based on a Transport Control Protocol (TCP) and a mutual Transport Layer Security (mtLS), wherein the IoT nodes are configured to sign a message to be sent, and wherein receiving IoT nodes are configured to check an origin of the message based on a signature included therein.

11. The local IoT node network according to claim 10, wherein execution of the application logic by means of which the processing unit of the at least one of the IoT nodes are coupled via messages exchanged via the secure multicast communication between the IoT nodes of the group.

12. The local IoT node network according to claim 10, wherein all IoT nodes of the group share a common timebase, and the IoT nodes embed the common timebase in messages sent, and receiving IoT nodes check whether the messages are current based on the common timebase contained therein.

13. The local IoT node network according to claim 12, wherein the IoT nodes update the common timebase independently.

14. The local IoT node network according to claim 10, wherein the receiving IoT nodes are configured to implement different rights within the application based on the signature.

15. The local IoT node network according to claim 10, wherein the first interface of the IoT nodes is configured to be display-less and free of control elements.

16. The local IoT node network according to claim 10, wherein each IoT node has a first public cryptographic key and a first private cryptographic key, the first private cryptographic key being stored in advance or generated by the IoT node.

17. The local IoT node network according to claim 10, wherein the necessary information for secure multicast communication between the IoT nodes includes a multicast address, a symmetric key and a common timebase.

18. The local IoT node network according to claim 10, wherein the secure multicast communication between the IoT nodes within the group represents an n-m communication.

* * * * *